US009222587B2

(12) United States Patent
Purekar et al.

(10) Patent No.: US 9,222,587 B2
(45) Date of Patent: Dec. 29, 2015

(54) OIL PRESSURE REGULATOR

(75) Inventors: Dhanesh Purekar, Columbus, IN (US); Paul A. Hayes, Columbus, IN (US)

(73) Assignee: CUMMINS IP, INC., Columbus, IN (US)

( * ) Notice: Subject to any disclaimer, the term of this patent is extended or adjusted under 35 U.S.C. 154(b) by 788 days.

(21) Appl. No.: 13/467,575

(22) Filed: May 9, 2012

(65) Prior Publication Data

US 2013/0299012 A1 Nov. 14, 2013

(51) Int. Cl.
*F16K 15/02* (2006.01)
*F01M 1/10* (2006.01)
*F01M 11/03* (2006.01)

(52) U.S. Cl.
CPC ...... *F16K 15/025* (2013.01); *F01M 2001/1092* (2013.01); *F01M 2011/031* (2013.01); *Y10T 137/7922* (2015.04)

(58) Field of Classification Search
CPC .. F16K 15/025; F16K 17/0433; F16K 7/0446
USPC ............ 137/528, 538, 540, 535, 514.3, 514.5
See application file for complete search history.

(56) References Cited

U.S. PATENT DOCUMENTS 2,633,147 A * 3/1953 Badami .................. 137/506
3,027,913 A * 4/1962 Chatham et al. ............ 137/484.2
4,373,333 A 2/1983 Coleman
4,743,179 A 5/1988 Waas et al.
4,883,083 A 11/1989 Fisher et al.
6,543,476 B2 4/2003 Kazaoka

FOREIGN PATENT DOCUMENTS

GB 2037947 A 7/1980
RU 16185 5/2000
SU 1523691 9/1987

OTHER PUBLICATIONS

International Preliminary Report on Patentability and Written Opinion of the International Searching Authority, issued: Nov. 11, 2014.

* cited by examiner

*Primary Examiner* — Kevin Lee
*Assistant Examiner* — P. Macade Nichols
(74) *Attorney, Agent, or Firm* — Foley & Lardner LLP

(57) ABSTRACT

An oil pressure regulator includes a chamber that extends between an oil supply line and an oil bypass line. The chamber extends from a closed end of the chamber to an open end of the chamber. The regulator includes a plunger that is positioned within the chamber. The plunger is movable within the chamber between a first position preventing oil flow from the oil supply line to the oil bypass line, and a second position allowing oil flow from the oil supply line to the oil bypass line. Also, the regulator includes a compression spring that is positioned within the chamber between the plunger and the closed end. When the plunger is in the first position, the compression spring is in an uncompressed state, and when the plunger is in the second position, the compression spring is in a compressed state.

18 Claims, 7 Drawing Sheets

|  | Compression Spring 230 | Compression Spring 130 |
| --- | --- | --- |
| Free Length | 66 mm | 45.2 mm |
| Outside Diameter | 14.7 mm | 14.7 mm |
| Wire Diameter | 1.98 mm | 2.2286 mm |
| # of Coils | 16.5 | 8.2 |
| Spring Rate | 5.4 N/mm | 22.81 N/mm |
| Valve Opening Load | 147.2 N | 147.1 N |
| Estimated Max Valve Opening Pressure | 81.53 psi | 81.47 psi |

Figure 7

OIL PRESSURE REGULATOR

FIELD

This disclosure relates to fluid pressure regulation, and more particularly to regulating the pressure of oil in internal combustion engines.

BACKGROUND

Pressure regulators for controlling the pressure of oil within an internal combustion engine system are well known in the art. In typical applications, a pressure regulator is positioned between an oil supply line and an oil bypass line. Generally, the pressure regulator is designed to control the oil pressure in the engine system by allowing at least some of the oil in the supply line to be released into the oil bypass line when the pressure of the oil in the supply line reaches a prescribed threshold. In this manner, oil pressure regulators maintain the pressure of the oil in the system below a predetermined upper limit.

Certain pressure regulators include a plunger that is movable within a chamber to prevent and allow the release of oil from the oil supply line into the oil bypass line. In conventional regulators of this type, the plunger is biased into a seated position against the chamber by a compression spring. The plunger commonly includes through-holes that are open to both the oil supply and bypass lines to allow oil to flow therethrough when the plunger is moved into an open position away from the seated position. The plunger moves away from the seated position toward the open position as the pressure applied to the plunger by the oil in the oil supply line exceeds the biasing force of the spring. As the pressure of the oil increases, the increasing biasing force of the spring is overcome and the plunger is moved toward the open position until a threshold pressure, corresponding with the plunger being in the open position, is reached and oil is allowed to flow into the bypass line. Accordingly, the characteristics of the compression spring are selected according to the desired threshold pressure of the system. As oil is bypassed from the supply line to the bypass line, the overall pressure of the oil in the system decreases and the plunger moves away from the open position toward the seated position. In this manner, the oil regulator controls the oil pressure in the system in a passive manner through the give-and-take interaction between the compression spring and the oil pressure of the system via the plunger.

Conventional regulators are configured with biasing elements that force the plunger into a seated position against an open end of the chamber when there is no pressure within the system or the pressure within the system is low. In other words, when the oil pressure within the system is not enough to overcome the biasing force of the spring (e.g., during idling or when the engine is off), a pre-compression of the spring applies a biasing force against the plunger to urge the plunger into contact with the chamber.

SUMMARY

The subject matter of the present application has been developed in response to the present state of the art, and in particular, in response to the problems and needs in oil and fluid system art that have not yet been fully solved by currently available oil and other fluid pressure regulators. For example, as discovered by the inventors of the present application, as the oil pressure fluctuates between pressures insufficient to more the plunger and sufficient to initiate movement of the plunger, such as during idling of the engine, the plunger in prior art pressure regulator designs as discussed above tend to oscillate into and out of contact with the open end of the chamber. The inventors have found that the rapid and repeated impacts between the plunger and chamber during such oscillation tend to produce buzz noise that adds to the overall noise of the engine. Because noisy engines are generally undesirable, conventional regulators that produce buzz noise in this manner, although likely adequate for controlling the pressure within an engine system, have significant noise-producing flaws.

Accordingly, the subject matter of the present application has been developed to provide a fluid pressure regulator, and associated apparatus, system, and method, for controlling the pressure of the fluid within a system that overcomes many of the shortcomings of the prior art. For example, in some embodiments, as opposed to prior art systems, the pressure regulator of the present disclosure prevents oscillatory impacts between a plunger and the chamber within which the plunger is movable. Generally, in certain implementations, the compression spring of the pressure regulator of the present disclosure is specifically configured to not forcibly seat the plunger against the chamber. In other words, when the fluid in the system is not enough to overcome the biasing force of the compression spring, the plunger is still not forced against the chamber. Basically, according to some embodiments, during idling speeds and even when the engine is off, the compression spring is not compressed against the plunger to force the plunger into a seated position against the chamber. Because the plunger is not forcibly or biased into a seated position against the chamber by the biasing force of the spring, fluctuations between oil pressure during low operating speeds of the engine do not produce undesirable buzz noise.

According to one embodiment, an apparatus for regulating the pressure of a fluid includes a fluid supply line and a fluid return line. The apparatus also includes a pressure regulator that is coupled to the fluid supply and return lines. The pressure regulator is in fluid receiving communication with fluid in the fluid supply line and capable of being in fluid providing communication with the fluid return line. Additionally, the pressure regulator is actuatable between a first configuration preventing fluid transfer between the fluid supply line and fluid return line and a second configuration allowing fluid transfer between the fluid supply line and the fluid return line. The pressure regulator includes a central channel that has a closed end and an open end. The open end includes a lip and the pressure regulator further includes a plunger and a biasing member retained within the central channel by the closed end and the lip of the open end. In the first configuration, the biasing member is in an unbiased state, and in the second configuration the biasing member is in a biased state. In the second configuration, fluid is transferred from the fluid supply line, through the central channel and at least one channel formed in the plunger, and into the fluid return line.

In one implementation of the apparatus, the central channel has a length extending between the closed end and the lip of the open end. The biasing member is engageable with the plunger. When the biasing member is engaged with the plunger, a combined length of the biasing member in the unbiased state and the plunger is less than the length of the central channel. The central channel can include a central axis. In the first configuration, an axially extending gap is defined between the lip and an end of the plunger closest the lip.

According to one implementation of the apparatus, the biasing member includes a compression spring that applies a biasing force to the plunger in a direction away from the fluid return line when the pressure regulator is in the second configuration. In the first configuration, the compression spring can be in an uncompressed state. In certain implementations, in the first configuration, fluid in the fluid supply line maintains a gap between the lip and an end of the plunger closest the lip.

In some implementations, the fluid supply line includes a first bypass line section in fluid receiving communication with a fluid source, and the fluid return line includes a second bypass line section in fluid providing communication with the fluid source. The fluid can be oil and the fluid source may include an oil pan.

In yet one embodiment, a method for regulating the pressure of a fluid includes directing a fluid at a first pressure against a plunger movably retained within a chamber. The plunger is engageable with a compression spring retained within the chamber. The compression spring is in a substantially non-compressed state with the fluid at the first pressure directed against the plunger. The method further includes increasing a pressure of the fluid to a second pressure greater than the first pressure. Additionally, the method includes directing the fluid at the second pressure against the plunger to compress the spring and move the plunger along the chamber.

In some implementations, the fluid includes oil, the first pressure is associated with an idling speed of an internal combustion engine, and the second pressure is associated with an above-idling speed of an internal combustion engine. The method may include preventing fluid flow from a fluid source to a fluid bypass line through the plunger with the fluid at the first pressure and allowing fluid flow from the fluid source to the fluid bypass line through the plunger with the fluid at the second pressure.

According to another embodiment, an oil pressure regulator for an internal combustion engine having an oil supply line and oil bypass line is disclosed. The oil pressure regulator includes a chamber that extends between the oil supply line and oil bypass line. The chamber extends from a closed end of the chamber to an open end of the chamber. The regulator includes a plunger that is positioned within the chamber. The plunger is movable within the chamber between a first position preventing oil flow from the oil supply line to the oil bypass line, and a second position allowing oil flow from the oil supply line to the oil bypass line. Also, the regulator includes a compression spring that is positioned within the chamber between the plunger and the closed end. When the plunger is in the first position, the compression spring is in an uncompressed state, and when the plunger is in the second position, the compression spring is in a compressed state.

In some implementations of the oil pressure regulator, the engine is operable in a low speed range and a high speed range. The plunger is movable between the first and second positions via pressure applied to the plunger by oil in the supply line. In the low speed range, the pressure applied to the plunger is a low pressure, and in the high speed range, the pressure applied to the plunger is a high pressure.

According to certain implementations of the fluid pressure regulator, the plunger extends from a first end to a second end. The first end includes a recess for receiving a portion of the compression spring and the second end includes a channel that extends from the second end to a side of the plunger. In the first position, the channel is closed to the oil bypass line, and in the second position, the channel is open to the oil bypass line. A combined length of the plunger and compression spring with the compression spring received within the recess of the first end of the plunger can be less than an overall length of the chamber extending between the closed and open ends of the chamber. In the first position, a gap exists between the second end of the plunger and the open end of the chamber.

In some implementations of the fluid pressure regulator, the compression spring is configured such that the compression spring does not apply a biasing force against the plunger when the plunger is in the first position. A ratio of the length of the compression spring when uncompressed in the uncompressed state to the spring constant of the compression spring is between about 1 and 3. According to certain implementations, the plunger is not seated against the open end of the chamber when the plunger is in the first position.

In one embodiment of an internal combustion engine, the engine includes oil supply line and an oil bypass line. The engine also includes a chamber that is positioned between and fluidly coupling the oil supply and bypass lines. The chamber extends from a closed end to an open end that is open to the oil supply line. The engine further includes a plunger movably retained within the chamber between the closed and open ends. Additionally, the engine includes a compression spring that is retained within the chamber between the plunger and the closed end. The compression spring is configured to be in an uncompressed state when the engine is OFF such that the compression spring does not apply a biasing force to the plunger when the engine is OFF.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIG. 7 is a table comparing values for certain characteristics of one embodiment of a spring of a fluid pressure regulator of the present disclosure against the values for the same characteristics of a spring of a prior art fluid pressure regulator.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
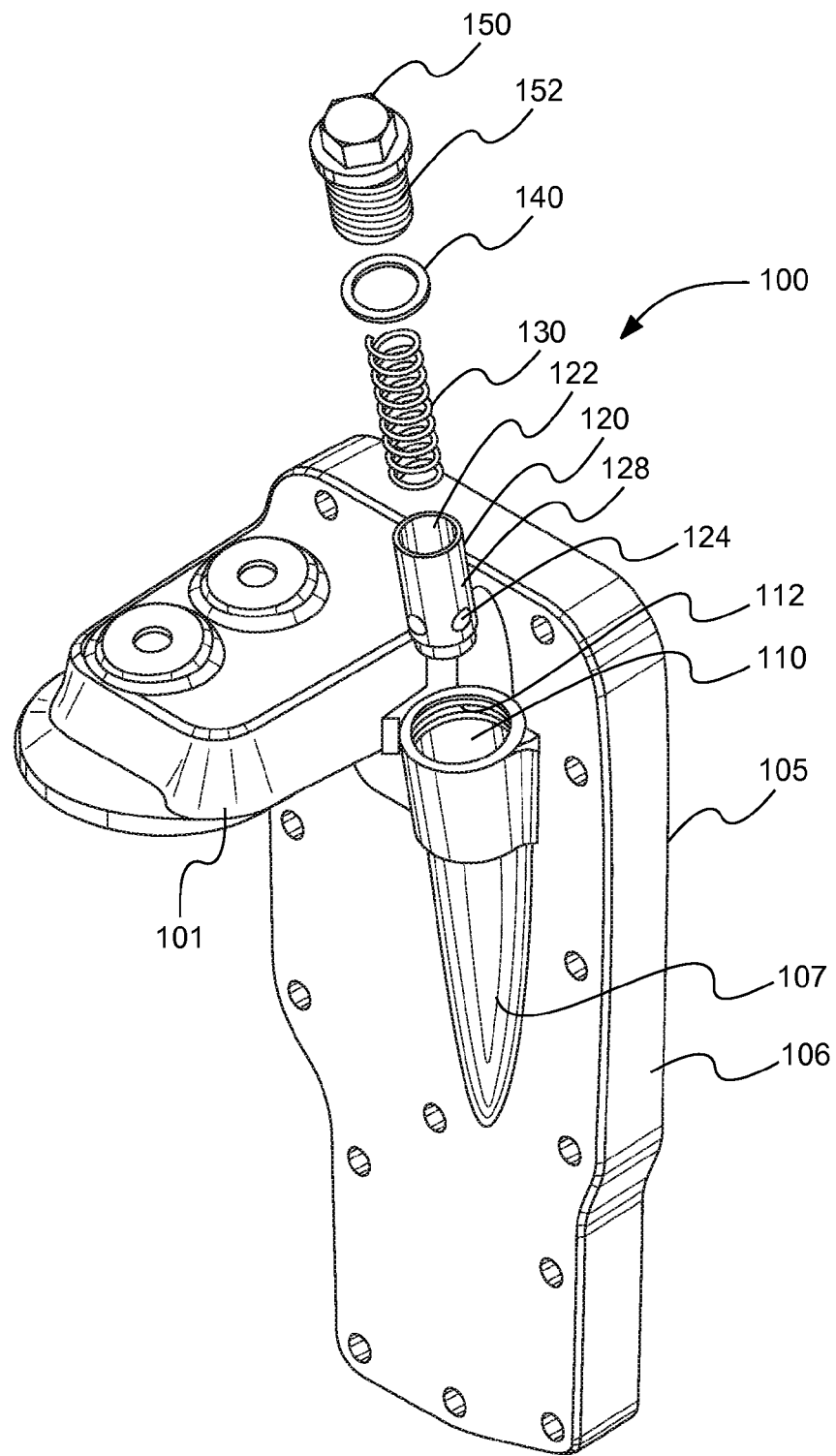
FIG. 1 is a perspective exploded view of a fluid pressure regulator according to one embodiment.

Referring to FIG. 1, according to one embodiment, a fluid pressure regulator 100 is associated with a base component 105. The base component 105 can be any of various types of components capable of coupling with, integrating, or housing a fluid pressure regulator 100. In some implementations, the base component 105 forms part of a larger system, such as a fluid filtration system. In the illustrated implementation, the base component 105 includes a bracket or plate 106 that is attachable to the engine block of an internal combustion engine 102 (see, e.g., FIG. 2). Additionally, the illustrated base component 105 includes a filter attachment portion 101 for securing a fluid filter thereto. In operation, fluid (e.g., oil) from the engine flows at least partially through the base component 105, through an attached fluid filter, and back into the engine.

Generally, in the illustrated embodiment, fluid from the engine is in fluid communication with the fluid pressure regulator 100, which regulates the pressure of the fluid via passive flow regulation techniques. The base component 105 may also accommodate a fluid bypass line that receives bypassed fluid from the fluid pressure regulator 100 if the pressure of the fluid exceeds an upper pressure threshold or limit. Although the fluid pressure regulator 100 is shown associated with a specific type of base component 105, in other embodiments, other types of base components can be used in conjunction with the fluid pressure regulator. Moreover, in some embodiments, the fluid pressure regulator 100 is not associated (e.g., integrated) with a base component 105, but effectively operates as a stand-alone device that is coupleable in fluid receiving communication with a fluid source in any of various manners and using any of various techniques.

The fluid pressure regulator 100 includes a chamber or central channel 110 defined by a substantially tubular-shaped element 107. In the illustrated embodiment, the tubular-shaped element 107 and associated chamber 110 are integrated as a one-piece monolithic construction with the bracket 106 of the base component 105. However, in some embodiments, the element 107 and associated chamber 110 can be formed separately and attached to another component (e.g., the base component 105). An upper portion of the interior surface of the element 107 defining the chamber 110 includes internal threads 112 configured to threadably engage the external threads 152 of a plug 150. Alternatively, the upper portion of the exterior surface of the element 107 may include external threads and the plug can include internal threads. Although the connection between the plug 150 and member 107 has been described as a threaded connection, in other embodiments, other types of sealed connections can be used as desired.

Figure 2:
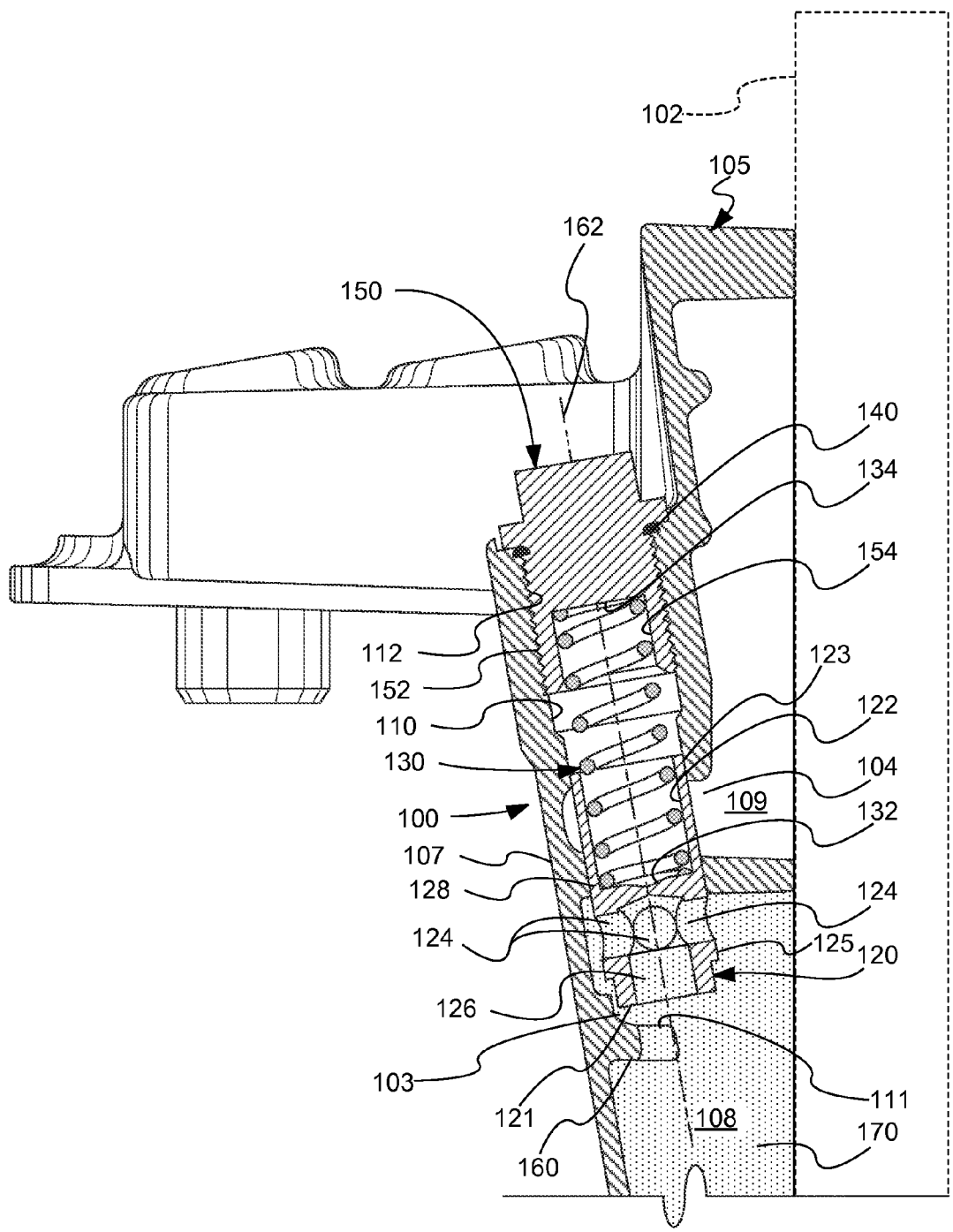
FIG. 2 is a cross-sectional side view of a fluid pressure regulator according to one embodiment.

The plug 150 is configured to seal or close an open end of the chamber 110 when the threads 112, 152 are threadably engaged. In this manner, the plug 150 defines a closed or sealed end 134 of the chamber 110 as shown in FIG. 2. To facilitate a sealed engagement between the plug 150 and the element 107, the fluid pressure regulator 100 includes a seal or gasket 140, which in some implementations, is an O-ring. When threadably engaged with the element 107, the plug 150 also acts to retain a plunger 120 and biasing member 130 within the chamber 110. Generally, the plunger 120 includes a body 128 defining a recess 122 formed in an upper end of the plunger and one or more fluid channels 124 formed proximate a lower end of the plunger. In the illustrated implementation, the body 128 has a generally cylindrical shape with a circular-shaped cross-section to correspond with a circular-shaped cross-section of the chamber 110. However, the plunger body 128 and chamber 110 may have any of various corresponding shapes with any of various corresponding non-circular-shaped cross-sections as desired. The biasing member 130 can be a compression spring as illustrated with a specific uncompressed length and spring constant as will be described in more detail below.

Referring to FIG. 2, the fluid pressure regulator 100 is shown fully assembled in cooperation with the base component 105. The plate 107 of the base component 105 has formed therein at least two chambers or fluid lines partitioned relative to each other, but fluidly coupleable via the fluid pressure regulator 100. More specifically, the plate 107 defines a fluid supply line or chamber 108 and a fluid return line or chamber 109. In certain applications, the fluid supply and return lines 108, 109 define respective sections of a fluid bypass line that is operable to bypass a portion of fluid from a main fluid line back to a fluid source, such as an oil pan containing oil, to reduce the pressure of the fluid in the main fluid line. The chamber or central channel 110 of the fluid pressure regulator 100 acts as a fluid conduit between the fluid supply and return lines 108, 109. Generally, the plunger 120 is operable (e.g., movable) to block or allow fluid flow from the fluid supply line 108 to the fluid return line 109 through the chamber 110.

The plunger 120 is positioned within the chamber 110 between the closed end 134 of the chamber defined by the plug 150 and an open end 111 of the chamber defined by a lip 160. The lip 160 includes a protrusion that extends radially inwardly toward the central axis 162 of the chamber 110. Further, the lip 160 extends circumferentially around only a portion of the circumference of the chamber 110. In this manner, the lip 160 is able to define a stop for retaining the plunger 150 within the chamber, as well as to facilitate fluid flow into the open end 111 of the chamber. The chamber 110 has a specifically sized and shaped cross-section to receive and laterally retain the plunger 120. For example, the cross-section of the chamber 110 can be circular and the plunger 120 can have a circular outer periphery that is just smaller than the cross-section of the chamber. In this manner, the plunger 120 is linearly movable within the chamber 110 along the central axis 162 of the chamber, but prevented from lateral movement within the chamber (e.g., radially directed movement away from the central axis). In some implementations, tighter clearances on the plunger and chamber can be implemented to create a tighter fit between the plunger and chamber such that lateral vibrations of the plunger against the chamber due to fluid passing through the plunger is reduced or eliminated. The linearly directed movement of the plunger 120 within the chamber 110 is constrained at opposing ends by the plug 150 and the lip 160. Further, linear movement of the plunger 120 within the chamber 110 can be restricted via the biasing force of the biasing member 130.

The plunger 120 includes the recess 122 formed in a first end portion 123 of the plunger and a fluid inlet 126 formed in a second end portion 125 opposing the first end portion. The recess 122 is configured to receive a first end portion of the biasing member 130, with the opposing second end portion of the biasing member 130 being received within a recess 154 formed in the plug 150. In this manner, the biasing member 130 is retained within the chamber 110 via seated engagement with the recess 122 of the plunger 120 and the recess 154 of the plug 150. In one embodiment, the recesses 122, 154 are shaped to allow the biasing member 130 (which is a compression spring in the illustrated embodiments) to axially compress along the central axis 162, but substantially prevent lateral movement or deformation. The fluid inlet 126 extends from the second or lower end 121 of the plunger 120 to a plurality of fluid channels 124 formed in a sidewall of the plunger at a location between the first and second end portions of the plunger. In this manner, fluid 170 in the fluid supply line 108 is flowable through the fluid inlet 126 and into the fluid channels 124. Although the illustrated plunger 120 includes a plurality of fluid channels 124 (e.g., four fluid channels), in other embodiments, the plunger can include less than four fluid channels (e.g., one fluid channel) or more than four fluid channels. For embodiments with a circular-shaped chamber 110 and plunger 120, the plurality of fluid channels 124 ensures at least one of the channels 124 is open to the fluid return line 109 should the plunger be rotated relative to the chamber.

Figure 3:
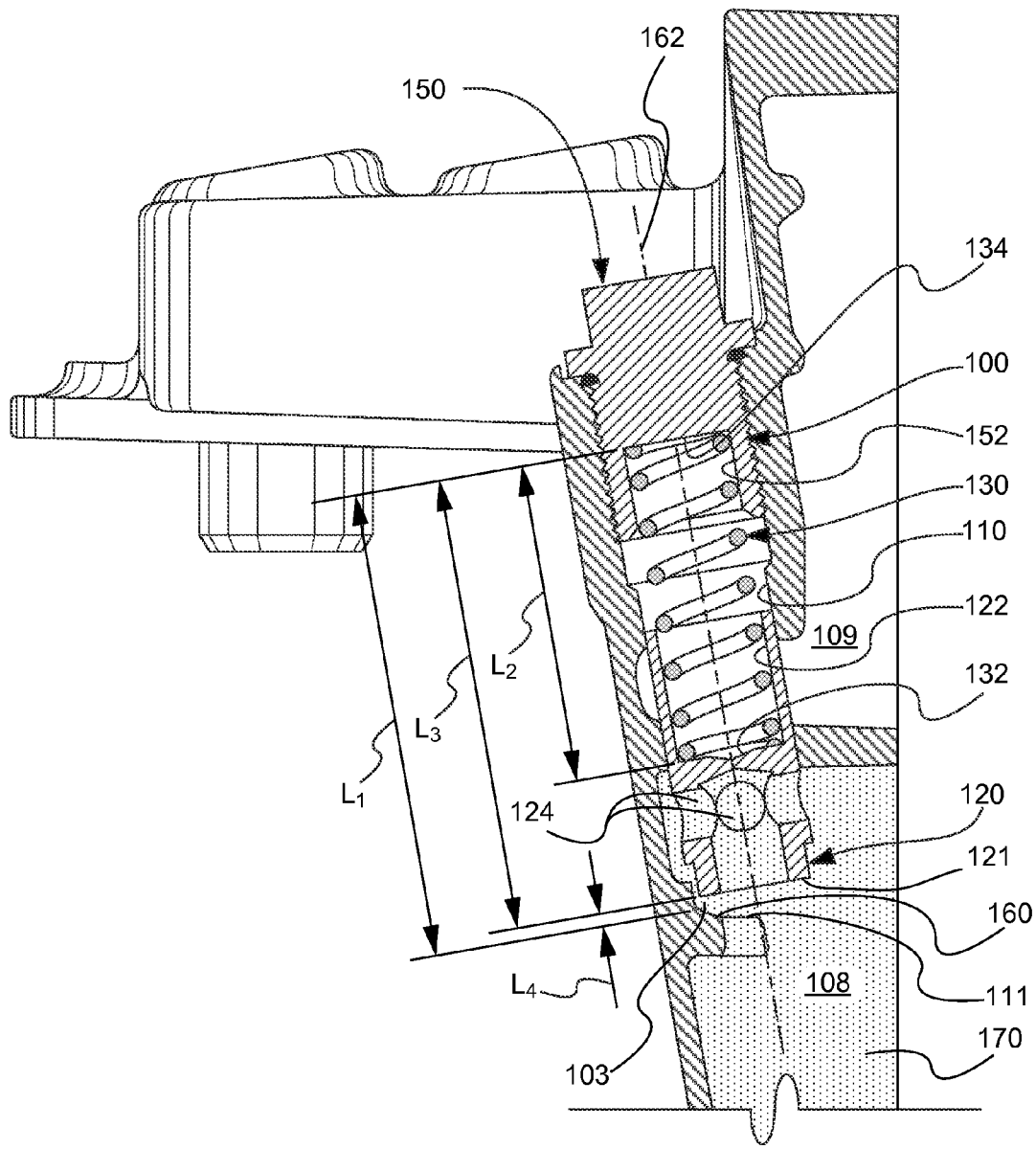
FIG. 3 is a cross-sectional side view of a fluid pressure regulator similar to FIG. 2 but indicating relative lengths of the components of the regulator.

The biasing member 130 of the illustrated embodiment is a compression spring. The compression spring 130 is configured to apply a biasing force (e.g., stored energy) against a compression load, which results in the length of the spring becoming shorter as the compression load applied to the spring increases. Generally, the compression spring 130 is a single wire wound into multiple coils. The wire is made from a resiliently deformable material to allow the compression spring 130 to return from a compressed (e.g., biased) state when a load is applied to the spring to an uncompressed or original (e.g., unbiased) state when the load is removed from the spring. In some implementations, the wire is made from a metal or metal alloy, such as steel, or a hardened plastic. The compression spring 130 has an overall free or uncompressed length $L_2$ as shown in FIG. 3.

The biasing force or stored energy of the compression spring 130 is dictated by a spring constant or rate of the spring. As traditionally defined by Hooke's law, the biasing force (e.g., the force with which the spring pushes back on a compression load) is linearly proportional to the displacement of the spring under compression away from the equilibrium or uncompressed length of the spring. The spring constant of the spring 130 is simply multiplied by the displacement to determine the biasing force of the spring under any of various compression loads. Accordingly, the higher the spring constant of the spring 130, the higher the biasing or push-back force of the spring. Likewise, the larger the displacement of the spring under a compression load, the higher the biasing force of the spring. The spring constant of the compression spring 130 is based on several controllable characteristics, such as the thickness of the wire, length of the wire, number of coils in the spring, diameter of the coils of the spring, the material (e.g., strength) of the wire, length of the spring, etc. However, one or more of the factors may be constrained in view of external factors, such as cost, manufacturing complexity, material availability, and the constraints (e.g., space and size) of the system within which the spring is being used. In other words, the compression spring 130 can be manufactured to have a specific spring constant by cooperatively selecting the parameters for the various spring characteristics affecting the spring constant in view of any external constraints.

Although the biasing member 130 is a compression spring in the illustrated embodiments, in other embodiments, the biasing member can be any of various devices or components capable of biasing the plunger 120 with a precisely controlled or selectable biasing force.

Generally, the fluid pressure regulator 100 is configured to regulate the pressure of the fluid 170 in the fluid supply line 108 by passively allowing at least some of the fluid 170 to pass through the regulator into the fluid return line 109 when the pressure of the fluid 170 reaches a predetermined upper limit. As some of the fluid 170 in the fluid supply line 108 is released to the fluid return line 109, the pressure of the fluid 170 in the fluid supply line is correspondingly lowered. In this manner, the fluid pressure regulator 100 maintains the pressure of the fluid 170 in the fluid supply line 108 below the predetermined upper limit.

Figure 6:
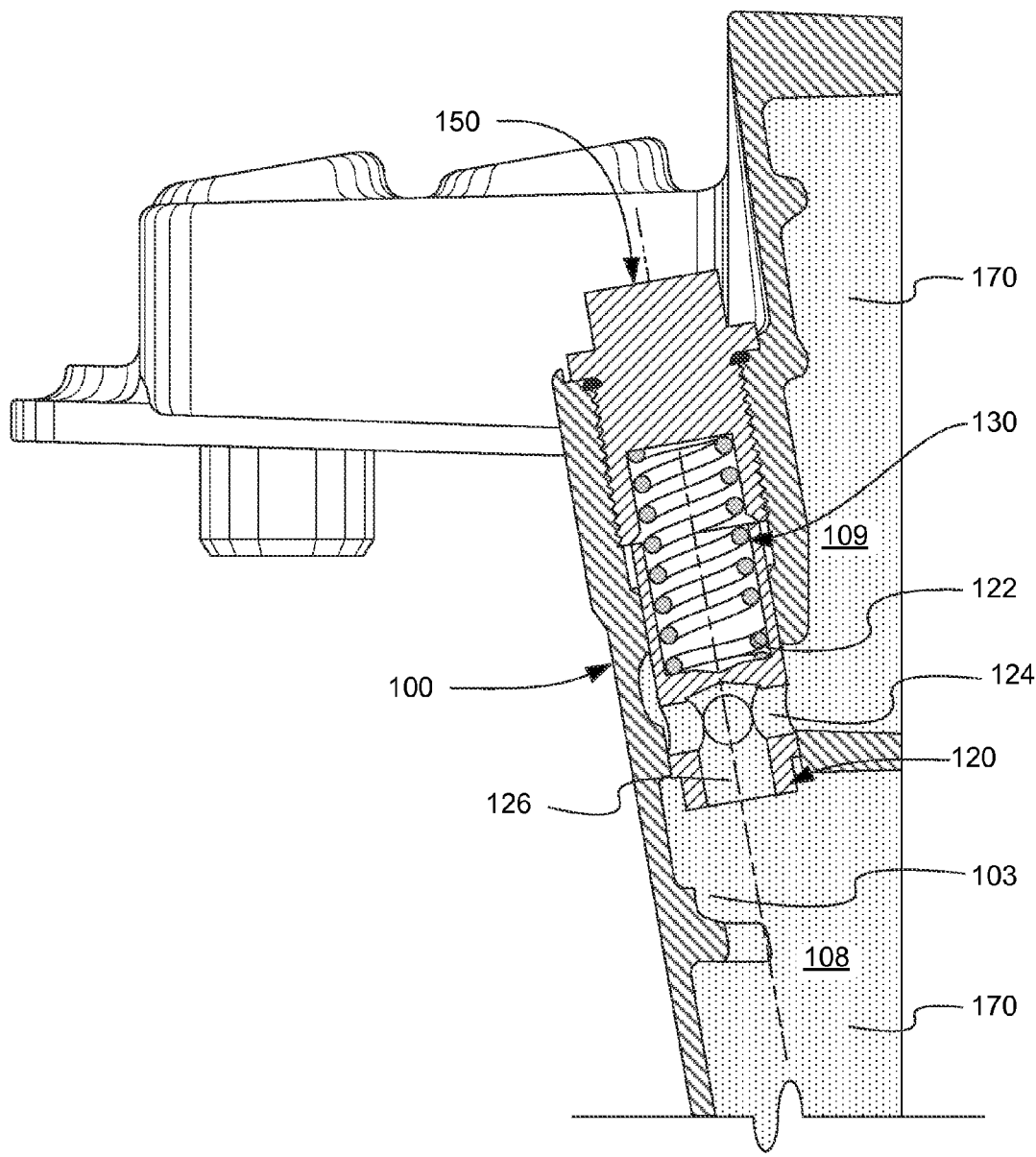
FIG. 6 is a cross-sectional side view of the fluid pressure regulator of FIG. 2 shown with the plunger in an open position.

The fluid pressure regulator 100 passively regulates the flow of fluid 170 from the fluid supply line 107 into the fluid return line 109 by blocking a portion of the chamber 110 between the lines 107, 109 with the plunger 120 when the pressure of the fluid 170 remains below the predetermined upper limit and moving the plunger 120 to allow the fluid 170 to pass through the portion of the chamber between the lines 107, 109 when the pressure of the fluid 170 exceeds the predetermined upper limit. The plunger 120 is movable between a closed position or first configuration as shown in FIG. 2 and an open position or second configuration as shown in FIG. 6. As shown, in the closed position, the inlet 104 of the fluid return line 154 is blocked or covered by the first end portion (e.g., a sidewall) of the plunger 120. Although the fluid 170 in the fluid supply line 108 is able to enter the fluid inlet 126 and fluid channels 124 when the plunger 120 is in the closed position, an internal wall 132 of the plunger separating the recess 122 and the channels 124 of the plunger blocks the fluid 170 from entering the fluid return line 109.

As the pressure of the fluid 170 increases, the pressure or force applied to the plunger 120 (e.g., the internal wall 132 of the plunger) also increases. The pressure of the fluid 170 is applied to the plunger 120 as a force in the axial direction (e.g., parallel to the central axis 162 of the chamber 110). The axially directed force on the plunger urges the plunger 120 in an axial direction against the compression spring 130, which applies a biasing force against the plunger that resists movement of the plunger. Once the pressure of the fluid 170 reaches a predetermined lower limit, the force applied by the plunger 120 on the spring exceeds the biasing force of the spring and the spring begins to displace or compress the compression spring 130, which results in the plunger 120 moving axially upwardly along the chamber 110 as shown by directional arrow 131 in FIG. 5.

Figure 5:
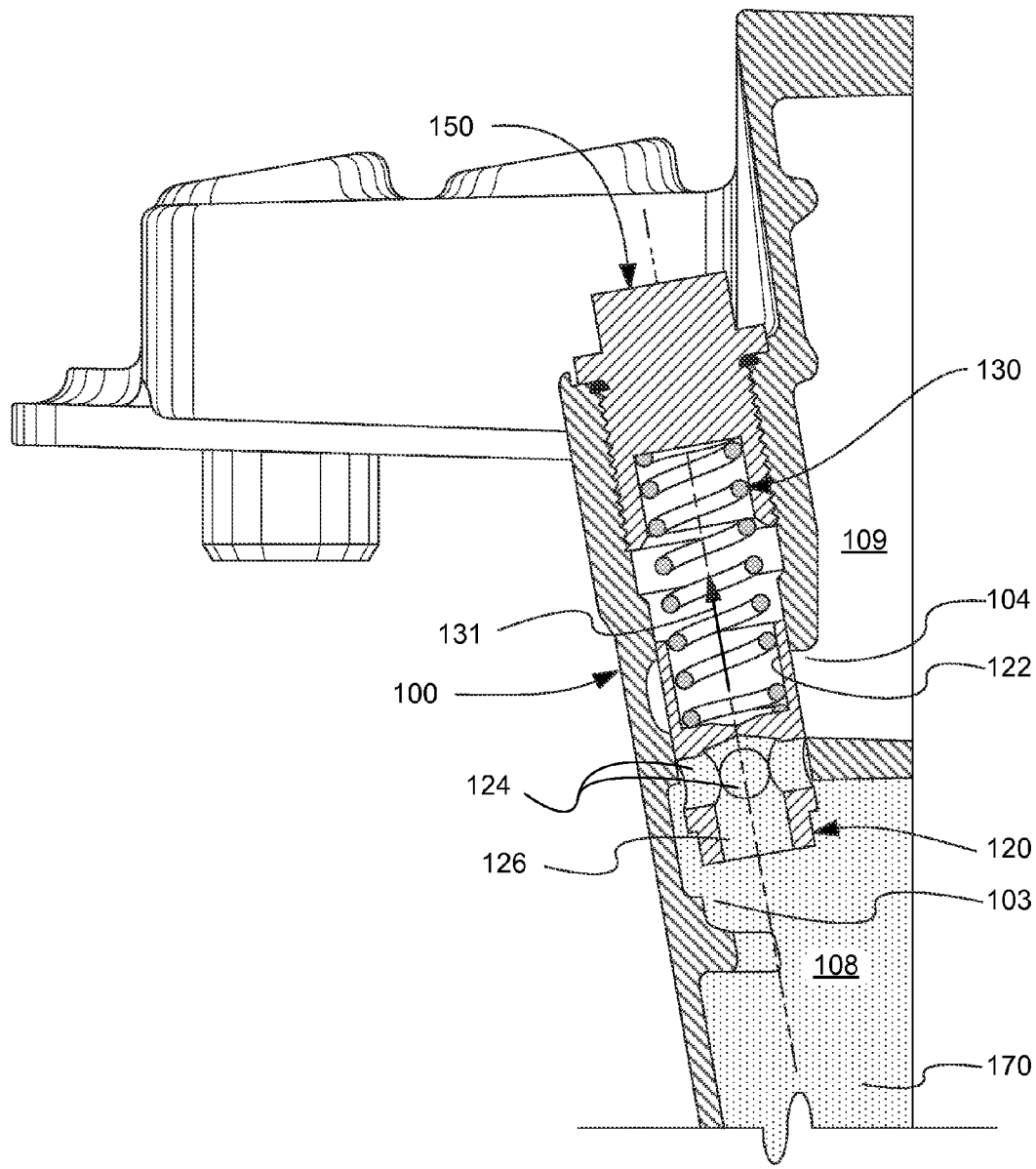
FIG. 5 is a cross-sectional side view of the fluid pressure regulator of FIG. 2 shown with a plunger in near open position.

As the pressure of the fluid 170 increases above the predetermined lower limit, the increasing biasing force of the spring 130 is overcome and spring is further displaced, which allows the plunger 120 to move further along the chamber 110. When the pressure of the fluid 170 reaches, but doesn't exceed, the predetermined upper limit, the plunger 120 is positioned in a near open position as shown in FIG. 5. In the near open position, an uppermost edge of one of the fluid channels 124 is aligned with a bottommost edge of the inlet 104 to the fluid return line 109. Accordingly, in the near open position, fluid 170 from the fluid supply line 108 has not yet started to flow through the inlet 104. However, any further increase of the pressure of the fluid 170 beyond the predetermined upper limit will further compress the spring 130 and move the plunger 120 upwardly enough to place the plunger in an open position, which exposes at least a portion of the fluid channel 124 to the inlet 104 to allow some of the fluid 170 to flow into the fluid supply line 109. Should the pressure of the fluid 170 continue to increase, the spring 130 is even further compressed and the position of the plunger 120 moves further upwardly along the chamber 110 until a substantial portion of the fluid channel 124 in the plunger is exposed to the inlet 104 of the fluid return line 109 to allow even more fluid 170 to flow from the fluid supply line 108 to the fluid return line 109.

As the fluid 170 flows from the fluid supply line 108 into the fluid return line 109, the result is a corresponding drop in the pressure of the fluid in the fluid return line 109. Accordingly, if the pressure increase in the fluid 170 in the fluid supply line 108 does not compensate for the pressure drop, then the pressure applied to the plunger 120 decreases and the biasing force of the compression spring 130 overcomes the pressure applied to the plunger such that the plunger moves downwardly along the chamber 110. As the pressure of the fluid 170 continues to drop, the plunger 120 will correspondingly be forced downwardly by the compression spring 130 until the inlet 104 of the fluid return line 109 becomes inaccessible to the fluid channel(s) 124 of the plunger (e.g., near open position or closed position) and fluid flow between the supply and return lines is prevented.

Figure 4:
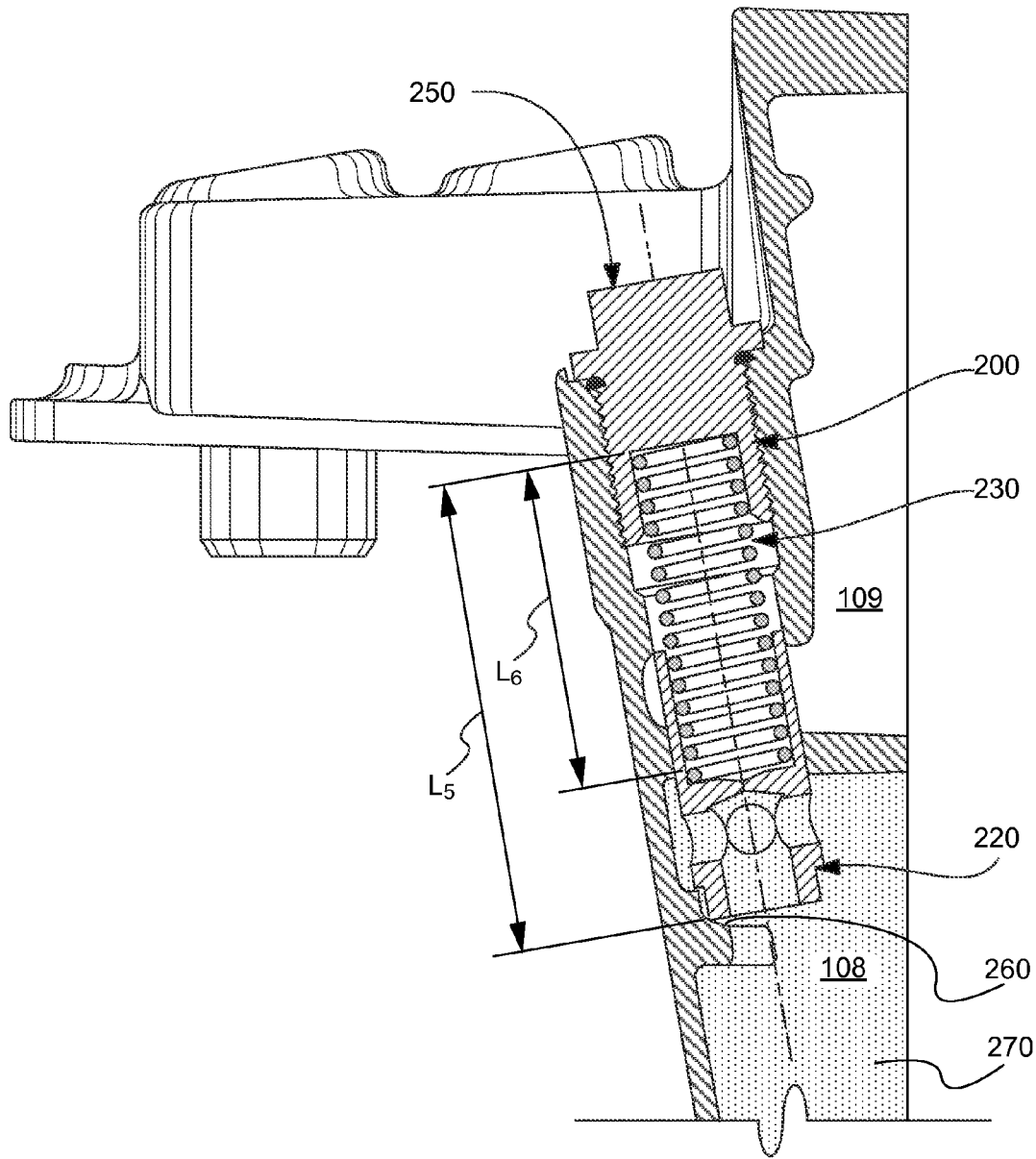
FIG. 4 is a cross-sectional side view of a fluid pressure regulator according to the prior art.

As discussed above, for applications where the pressure of the fluid in the fluid supply line continuously fluctuates between pressures below the lower pressure limit and above the lower pressure limit (i.e., pressures insufficient to raise the plunger and pressures sufficient to raise the plunger, respectively), the position of the plunger may have a tendency to correspondingly continuously oscillate. For example, in automotive applications where the fluid is oil and the engine is operating in a low oil pressure range, such as during idling, the plunger has a tendency to rapidly oscillate. If the plunger is in contact with or near the lip of the chamber at pressures near the lower pressure limit, the plunger may tend to rapidly oscillate against the lip causing noise-inducing vibrations. For example, as shown in FIG. 4, the prior art fluid pressure regulator 200 includes a compression spring 230 that is pre-loaded, or pre-compressed, to pre-bias the plunger 220 into contact with the lip 260. Accordingly, even when the fluid 270 is not applying a pressure against the plunger 220, the plunger is still in contact with the lip 260 due to the pre-compression of the compression spring 230.

If the pressure of the fluid increases and rapidly oscillates near the lower pressure limit associated with further compression of the compression spring 230 (i.e., a pressure sufficient to begin to overcome the biasing force of the spring 230), the plunger 220 will rapidly oscillate into and out of contact with the lip 260. Such rapidly oscillatory contact between the plunger 220 and the lip 260 creates undesirable buzz noise. Such buzz noise is virtually unavoidable when the compression spring 230 is pre-compressed to pre-bias the plunger 220 into contact with the lip 260. Further, removing the pre-bias on the plunger 220 would seem to allow the plunger 220 to more dramatically oscillate against the lip 260 or even the spring 230 as the plunger would have more freedom to freely move within the chamber between the lip and spring. However, the inventors have discovered, quite unexpectedly, that even with pressures well below the lower pressure limit, when an engine is turned ON, the pressure of the fluid 170 in the fluid supply line 108 is sufficiently high to move and retain a non-pre-biased plunger away from the lip, and against the compression spring, such that the plunger does not contact the lip even during rapid oscillation of the pressure of the fluid.

Ensuring the plunger 120 is not in contact with or near the lip 160 in applications where the pressure of the fluid continuously, and in some cases rapidly, fluctuates about the lower pressure limit reduces the tendency of the plunger to vibrate against the lip and create buzz noise. Accordingly, as shown in FIGS. 2 and 3, the compression spring 130 is configured such that even at fluid pressure below the lower pressure limit, an axially extending gap 103 (i.e., a gap extending in a direction parallel to the central axis 162) is defined between the lower end 121 of the plunger 120 and the lip 160. More specifically, the compression spring 130 is not pre-loaded, or pre-compressed, to pre-bias the lower end 121 of the plunger 120 into contact with the lip 160. In other words, when the fluid 170 within the fluid supply line 108 is not applying pressure to the plunger 120 (e.g., such as when the fluid is oil and an associated internal combustion engine is turned OFF), the plunger 120 freely floats (e.g., is freely movable or slidable) within the chamber 110.

In the illustrated implementation, without the application of fluid pressure, the plunger 120 will drop and rest against the lip 160 due to gravity. Similarly, in applications where the compression spring 130 is not fixed to the plug 150, the compression spring will also drop away from the plug and rest against the plunger 120. However, once the fluid is pressurized (e.g., such as when an engine is turned to an ON mode or is started), the pressure of the fluid 170 lifts or moves the plunger 120 away from the lip 160 to create the gap 103. Moreover, the fluid pressure maintains the gap 103 during all pressure changes of the fluid, such as those associated with various operating conditions of an engine. Accordingly, the fluid pressure regulator 100 of the present disclosure prevents contact between the plunger 120 and the lip 160 of the chamber 110 during fluid pressure oscillations within a low pressure range such that buzz noise associated with prior art regulator designs is eliminated. Further, there is no increase in the overall radiated noise of the engine when implementing the fluid pressure regulator 100 of the present disclosure. In one exemplary implementation, the gap 103 is at least 0.5 mm for a chamber 110 with a total length $L_1$ of about 47 mm.

Both the compression spring 130 and compression spring 230 are calibrated to sufficiently compress at a predetermined upper pressure limit of the fluid in the fluid supply line that the fluid flows or bleeds into the fluid return line as described above. However, in direct contrast to the compression spring 230, the compression spring 130 is further calibrated to have a free (e.g., uncompressed) length that is short enough to avoid pre-biasing the plunger 120 into contact with the lip 160. For example, referring to FIG. 3, which shows the compression spring 130 in an uncompressed or unbiased state, the total combined length $L_3$ of the uncompressed spring and plunger (with the spring fully seated within the recess 122 of the plunger as shown) is less than the total length $L_1$ of the chamber 110 as defined between the closed end 134 and the portion of the lip 160 closest the closed end. Because the total combined length $L_3$ is less than the total length $L_1$, when a pressure of the fluid 170 is at or below the predetermined lower pressure limit as described above, a gap 103 is defined having a length $L_4$ equal to the difference between the combined length $L_2$ and total length $L_1$. Accordingly, the gap 103 is defined as the minimum gap or distance between the portion of the lip 160 closest the lower end 121 of the plunger 120 and the plunger. As shown, in the uncompressed or free state, the compression spring 130 has a length $L_2$.

In contrast, the total combined length of the compressed spring 230 and plunger 220 (with the spring fully seated within the recess of the plunger as shown) is equal to the total length $L_5$ of the chamber of the pressure regulation device 200. This is because the pre-compression of the spring 230 forces the lower end of the plunger 220 into contact with the uppermost portion of the lip 260. In this manner, there is no gap between the portion of the lip 260 closest the lower end of the plunger 220 and the plunger (i.e., the gap is effectively zero). The oscillatory contact between plunger 220 and the lip 260 is the root cause of buzz noise within low pressure operating ranges as discussed above. Accordingly, in the compressed state, the compression spring 230 has a length $L_6$, which is necessarily longer than the length $L_2$ of the uncompressed compression spring 130 as the plungers 120, 220 and length of the chambers are assumed to be the same. Therefore, in an uncompressed state, the compression spring 230 is longer than the compression spring 130.

Because the free length of the compression spring 130 is longer than the free length of the compression spring 230, other characteristics of the compression spring 130 can be adjusted in order to achieve a spring constant of the spring 130 that facilitates flow of the fluid 170 into the fluid return line 109 at the upper pressure limit, which is associated with a valve opening load. With reference to FIG. 7, and according to one specific embodiment as an example only, in order to achieve approximately the same valve opening load (e.g., 147.2 N) or valve opening pressure (e.g., 81.53 psi) as the pressure regulation device 200, but allow the formation of the gap 103 as discussed above via a shorter free length $L_2$ of the spring 130 and with the same outer diameter of the coils (e.g., 14.7 mm), the compression spring 130 has a larger wire diameter and a fewer number of coils compared to the compression spring 230. The exemplary compression spring 130 represented in FIG. 7 has a spring constant (e.g., 22.81 N/mm) that is much higher than the spring constant of the compression spring 230 (e.g., 5.4 N/mm). Accordingly, the compression spring 130 is effectively harder to compress (e.g., stiffer) than the compression spring 230. However, because the biasing or push-back force of a spring increases as the spring is compressed, and the compression spring 230 is pre-compressed, the pressure regulation device 100 with the shorter, stiffer spring 130 is able to achieve the same valve opening load as the pressure regulation device 200 with the longer, more elastic spring 230.

Further, the significant calibration and structural differences between the compression springs 130, 230 are exemplified in the difference between the ratio of the free length (i.e., length in uncompressed state) of the compression springs to the respective spring constant of the compression springs. In some implementations, the ratio of the free length to the spring constant of the compression spring 130 is between about 1 and about 3. In one specific implementation represented in FIG. 7, the ratio is about 2. In contrast, the ratio of the free length to the spring constant of the compression spring 230 represented in FIG. 7 is about 12.

Although the fluid pressure regulator is described above as being applicable to internal combustion engine applications powered by gasoline or diesel fuels where the fluid is oil, in other embodiments, the fluid pressure regulator can be used in the same applications where the fluid is a fluid other than oil (e.g., transmission fluid, brake fluid, fuel, diesel exhaust fluid, etc.), or used in other applications where the fluid is oil or some other fluid under pressure constraints (e.g., pneumatic/hydraulic systems associated with electric motors). Moreover, existing prior art fluid pressure regulators can be easily retrofitted to include the features of the new fluid pressure regulator disclosed herein. For example, the springs of existing prior art fluid pressure regulators can be replaced with the shorter spring with a higher spring constant as described herein with other components of the pressure regulator remaining in place. More specifically, with a conventional pressure regulator in situ, the plug can be removed, the old spring can then be removed and replaced by the new spring, and the plug can be reconnected. Accordingly, with minimal modifications to existing fluid pressure regulators, the problems with buzz noise associated with existing regulators can be eliminated.

Further, although not specifically shown, instead of utilizing a shorter spring with a higher spring constant to eliminate buzz noise, in some embodiments, the lower end of the plunger can include a soft seal to soften the impact of the plunger against the lip, which may help to reduce, and in some cases eliminate, buzz noise.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for regulating the pressure of a fluid, comprising:
   a fluid supply line;
   a fluid return line; and
   a pressure regulator coupled to the fluid supply and return lines, the pressure regulator being in fluid receiving communication with fluid in the fluid supply line and capable of being in fluid providing communication with the fluid return line, wherein the pressure regulator is actuatable between a first configuration preventing fluid transfer between the fluid supply line and fluid return line and a second configuration allowing fluid transfer between the fluid supply line and the fluid return line;
   wherein the pressure regulator comprises a central channel having a closed end and an open end, the open end comprising a lip, the pressure regulator further comprising a plunger and a biasing member retained within the central channel by the closed end and the lip of the open end, the plunger including at least one channel in fluid receiving communication with the open end of the central channel, wherein in the first configuration the biasing member is in an unbiased state and in the second configuration the biasing member is in a biased state, and wherein in the second configuration fluid is transferred from the fluid supply line, through the central channel and the at least one channel formed in the plunger, and into the fluid return line.

2. The apparatus of claim 1, wherein the central channel has a length extending between the closed end and the lip of the open end, the biasing member being engageable with the plunger, and wherein when engaged a combined length of the biasing member in the unbiased state and the plunger is less than the length of the central channel.

3. The apparatus of claim 1, wherein the central channel comprises a central axis, and wherein in the first configuration an axially extending gap is defined between the lip and an end of the plunger closest the lip.

4. The apparatus of claim 1, wherein the biasing member comprises a compression spring that applies a biasing force to the plunger in a direction away from the fluid return line when the pressure regulator is in the second configuration.

5. The apparatus of claim 4, wherein when the pressure regulator is in the first configuration, the compression spring is in an uncompressed state.

6. The apparatus of claim 1, wherein in the first configuration fluid in the fluid supply line maintains a gap between the lip and an end of the plunger closest the lip.

7. The apparatus of claim 2, wherein the fluid comprises oil and the fluid source comprises an oil pan.

8. An apparatus for regulating the pressure of a fluid, comprising:
 a fluid supply line;
 a fluid return line; and
 a pressure regulator coupled to the fluid supply and return lines, the pressure regulator being in fluid receiving communication with fluid in the fluid supply line and capable of being in fluid providing communication with the fluid return line, wherein the pressure regulator is actuatable between a first configuration preventing fluid transfer between the fluid supply line and fluid return line and a second configuration allowing fluid transfer between the fluid supply line and the fluid return line;
 wherein the pressure regulator comprises a central channel having a closed end and an open end, the open end comprising a lip, the pressure regulator further comprising a plunger and a biasing member retained within the central channel by the closed end and the lip of the open end, wherein in the first configuration the biasing member is in an unbiased state and in the second configuration the biasing member is in a biased state, wherein in the second configuration fluid is transferred from the fluid supply line, through the central channel and at least one channel formed in the plunger, and into the fluid return line, and wherein the fluid supply line comprises a first bypass line section in fluid receiving communication with a fluid source, and the fluid return line comprises a second bypass line section in fluid providing communication with the fluid source.

9. A method for regulating the pressure of a fluid, comprising:
 directing a fluid at a first pressure against a plunger movably retained within a chamber, the plunger including at least one channel in fluid receiving communication with a fluid source, the plunger being engageable with a compression spring retained within the chamber, the compression spring being in a non-compressed state with the fluid at the first pressure directed against the plunger;
 increasing a pressure of the fluid to a second pressure greater than the first pressure; and
 directing the fluid at the second pressure against the plunger to compress the spring and move the plunger along the chamber; and
 preventing fluid flow from the fluid source to a fluid bypass line through the plunger with the fluid at the first pressure and allowing fluid flow from the fluid source to the fluid bypass line through the at least one channel in the plunger with the fluid at the second pressure.

10. A method for regulating the pressure of a fluid, comprising:
 directing a fluid at a first pressure against a plunger movably retained within a chamber, the plunger being engageable with a compression spring retained within the chamber, the compression spring being in a non-compressed state with the fluid at the first pressure directed against the plunger;
 increasing a pressure of the fluid to a second pressure greater than the first pressure; and
 directing the fluid at the second pressure against the plunger to compress the spring and move the plunger along the chamber,
 wherein the fluid comprises oil, the first pressure is associated with an idling speed of an internal combustion engine, and the second pressure is associated with an above-idling speed of an internal combustion engine.

11. An oil pressure regulator for an internal combustion engine having an oil supply line and oil bypass line, the oil pressure regulator comprising:
 a chamber extending between the oil supply line and oil bypass line, the chamber extending from a closed end of the chamber to an open end of the chamber;
 a plunger positioned within the chamber, the plunger being movable within the chamber between a first position preventing oil flow from the oil supply line to the oil bypass line, and a second position allowing oil flow from the oil supply line to the oil bypass line;
 a compression spring positioned within the chamber between the plunger and the closed end, wherein when the plunger is in the first position the compression spring is in an uncompressed state, and when the plunger is in the second position the compression spring is in a compressed state,
 wherein the plunger extends from a first end facing the closed end of the chamber to a second end facing the open end of the chamber, the first end comprising a recess for receiving a portion of the compression spring and the second end comprising a channel extending from the second end to a side of the plunger, and wherein in the first position, the channel is closed to the oil bypass line and in the second position, the channel is open to the oil bypass line.

12. The oil pressure regulator of claim 11, wherein a combined length of the plunger and compression spring with the compression spring received within the recess of the first end of the plunger is less than an overall length of the chamber extending between the closed and open ends of the chamber.

13. The oil pressure regulator of claim 11, wherein in the first position a gap exists between the second end of the plunger and the open end of the chamber.

14. The oil pressure regulator of claim 11, wherein the compression spring is configured such that the compression spring does not apply a biasing force against the plunger when the plunger is in the first position.

15. The oil pressure regulator of claim 14, wherein a ratio of the length of the compression spring when uncompressed in the uncompressed state to the spring constant of the compression spring is between about 1 and 3.

16. The oil pressure regulator of claim 11, wherein the plunger is not seated against the open end of the chamber when the plunger is in the first position.

17. An oil pressure regulator for an internal combustion engine having an oil supply line and oil bypass line, the oil pressure regulator comprising:

a chamber extending between the oil supply line and oil bypass line, the chamber extending from a closed end of the chamber to an open end of the chamber;

a plunger positioned within the chamber, the plunger being movable within the chamber between a first position preventing oil flow from the oil supply line to the oil bypass line, and a second position allowing oil flow from the oil supply line to the oil bypass line; and a compression spring positioned within the chamber between the plunger and the closed end, wherein when the plunger is in the first position the compression spring is in an uncompressed state, and when the plunger is in the second position the compression spring is in a compressed state, wherein the engine is operable in a low speed range and a high speed range, and the plunger is movable between the first and second positions via pressure applied to the plunger by oil in the supply line, and wherein in the low speed range the pressure applied to the plunger is a low pressure and in the high speed range the pressure applied to the plunger is a high pressure.

18. An internal combustion engine, comprising:

an oil supply line;

an oil bypass line;

a chamber positioned between and fluidly coupling the oil supply and bypass lines, the chamber extending from a closed end to an open end that is open to the oil supply line;

a plunger movably retained within the chamber between the closed and open ends; and a compression spring retained within the chamber between the plunger and the closed end;

wherein the compression spring is configured to be in an uncompressed state when the engine is OFF such that the compression spring does not apply a biasing force to the plunger when the engine is OFF.

* * * * *